(12) United States Patent
Yin et al.

(10) Patent No.: US 7,796,498 B2
(45) Date of Patent: Sep. 14, 2010

(54) WEIGHTED TONE RESERVATION FOR OFDM PAPR REDUCTION

(75) Inventors: Hujun Yin, San Jose, CA (US); Rongzhen Yang, Shanghai (CN); Xiaoliang Luo, Beijing (CN); Liang Jiang, Shanghai (CN); Longjing Zhu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 187 days.

(21) Appl. No.: 12/164,088

(22) Filed: Jun. 29, 2008

(65) Prior Publication Data

US 2009/0323513 A1 Dec. 31, 2009

(51) Int. Cl.
*H04J 11/00* (2006.01)
(52) U.S. Cl. ............ 370/210; 370/204; 370/208
(58) Field of Classification Search ............ 370/208, 370/210, 211, 203, 204, 209
See application file for complete search history.

(56) References Cited

U.S. PATENT DOCUMENTS

| 7,145,955 | B1* | 12/2006 | Bohnke et al. | 375/260 |
|---|---|---|---|---|
| 7,551,676 | B1* | 6/2009 | Yan et al. | 375/260 |
| 7,564,909 | B2* | 7/2009 | Sung et al. | 375/260 |
| 2002/0150036 | A1* | 10/2002 | Weerackody | 370/208 |
| 2005/0249110 | A1* | 11/2005 | Huo et al. | 370/208 |
| 2006/0250936 | A1* | 11/2006 | Chen et al. | 370/208 |
| 2006/0262714 | A1* | 11/2006 | Tarokh et al. | 370/208 |
| 2007/0291860 | A1* | 12/2007 | Wang et al. | 375/260 |
| 2008/0008084 | A1* | 1/2008 | Son | 370/208 |
| 2008/0137767 | A1* | 6/2008 | Jaenecke | 375/267 |
| 2008/0186899 | A1* | 8/2008 | Zhu et al. | 370/315 |
| 2009/0080556 | A1* | 3/2009 | Duan et al. | 375/262 |
| 2010/0002784 | A1* | 1/2010 | Hlinka et al. | 375/260 |
| 2010/0008432 | A1* | 1/2010 | Kim et al. | 375/260 |
| 2010/0027723 | A1* | 2/2010 | Kim et al. | 375/343 |

\* cited by examiner

*Primary Examiner*—Chi H. Pham
*Assistant Examiner*—Kevin Mew
(74) *Attorney, Agent, or Firm*—Carrie A. Boone, P.C.

(57) ABSTRACT

A weighted tone reservation (WTR) method and system are disclosed, for PAPR reduction. The WTR method solves the peak re-growth problem with minimum overhead. By avoiding the drawbacks of conventional tone reservation approaches, systems employing the WTR method may experience a significant PAPR reduction. The WTR method may be applied to next generation OFDMA-based wireless broadband technologies to increase system throughput and cell coverage.

13 Claims, 6 Drawing Sheets

WEIGHTED TONE RESERVATION FOR OFDM PAPR REDUCTION

TECHNICAL FIELD

This application relates to peak to average power ratio (PAPR) reduction, and more particularly, to the use of tone reservations to achieve PAPR reduction.

BACKGROUND

Orthogonal frequency division multiple access (OFDMA) modulation is well known to have a high peak to average power (PAPR) ratio. High PAPR reduces transmitter power amplifier (PA) power efficiency, increases PA back off, which in particular reduces the uplink link budget. Therefore, it is desirable to control the PAPR for uplink transmission.

PAPR reduction for OFDMA modulation is well studied. Tone reservation (TR) is one of the promising techniques. With TR, the system reserves a set of sub-carriers for PAPR reduction. The reserved tones are not used for data transmission. Instead, when one signal has high PAPR, a complementary sequence is transmitted on the reserved tones to reduce the PAPR of the signal.

However, the TR approach has a PAPR re-growth problem: the complementary sequence, when added with the original sequence, may reduce the original peak. However, the newly generated peak may be added constructively at non-peak locations. Therefore, multiple iterations may be required to achieve the desired PAPR level with added complexity.

Thus, there is a need for a PAPR reduction scheme that overcomes the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a weighted tone reservation (WTR) method and system are disclosed, for PAPR reduction. The WTR method solves the peak re-growth problem with minimum overhead. By avoiding the drawbacks of conventional tone reservation approaches, systems employing the WTR method may experience a significant PAPR reduction. The WTR method may be applied to next generation OFDMA-based wireless broadband technologies, such as 802.16e, 802.16m (WiMax II air interface), 3GPP (third generation partnership project), LTE (long term evolution), 3GPP UMB (ultra mobile broadband), and so on, to increase system throughput and cell coverage.

Figure 1:
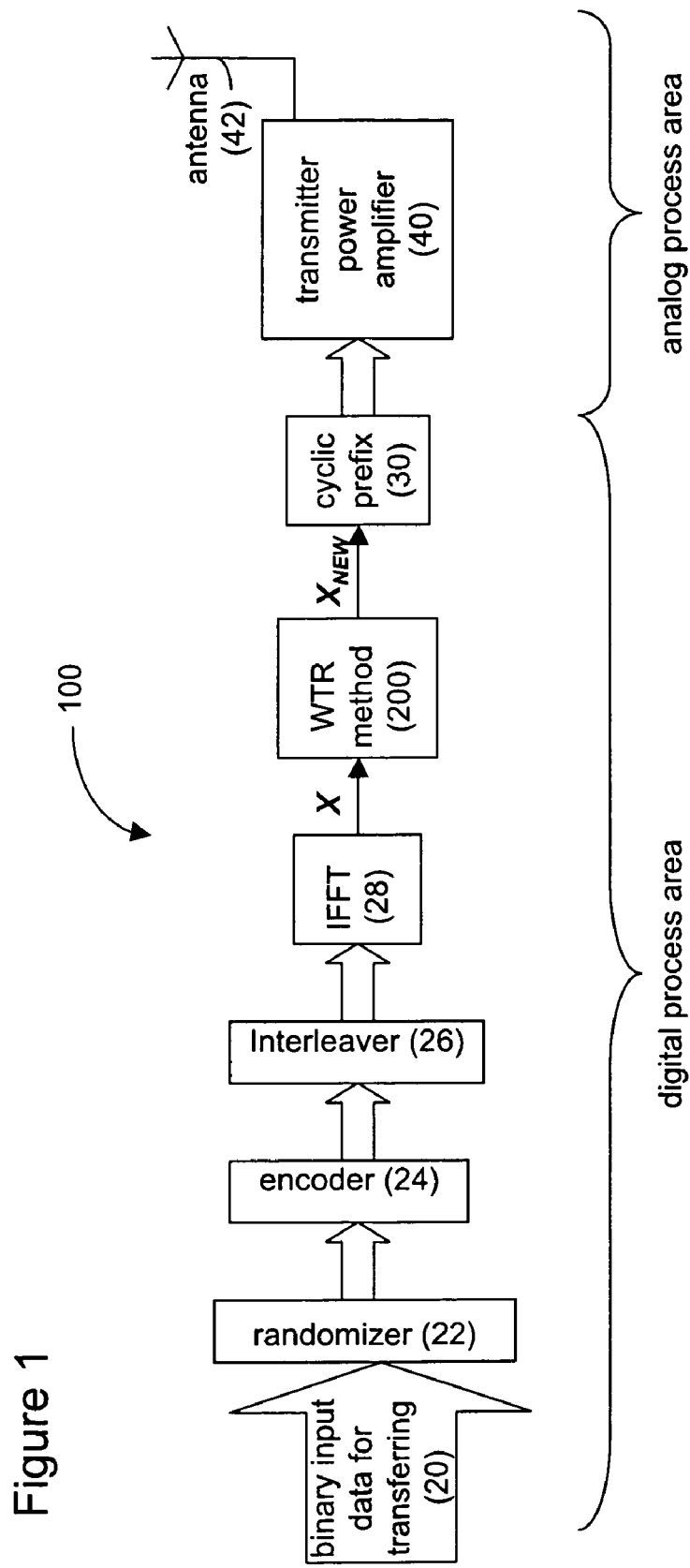
FIG. 1 is a block diagram showing a system using a weighted tone reservation method, according to some embodiments.

FIG. 1 is a block diagram of an OFDMA communication system 100 using a WTR method 200, according to some embodiments. The OFDMA communication system 100 may operate in a transmitter or in a receiver, such as in a base station or a subscriber (client) station of a wireless neighborhood. The OFDMA communication system 100 receives binary input data 20 into a randomizer 22, an encoder 24, and an interleaver 26. The binary data is then processed by an inverse fast Fourier transform (IFFT) 28, to generate an original sequence, X. The WTR method 200 is executed on the sequence, producing a new sequence, Xnew, which is then fed into the cyclic prefix processor 30, thus completing the digital processing. The transmit power amplifier 40 and the antenna 42 make up the analog process area of the OFDMA communication system 100. FIG. 1 is merely illustrative of some modules of the OFDMA communication system 100, as many modules are not described herein for simplicity.

In some embodiments, the WTR method 200 uses the following principles in its operation. Assume an original sequence, X, and a complementary sequence, $X_c$. The WTR method 200 wants to ensure that:

$$\max|X+X_c| < \max|X| \quad (1)$$

Most existing tone reservation (TR) algorithms focus on canceling existing peaks. However, simply canceling peaks may cause a peak re-growth problem.

The WTR method 200 performs a weighted quadratic peak reduction. First, the WTR method 200 takes the amplitude profile, $|X|$, of the sequence, X. When canceling the peaks, the WTR method 200 also pays attention to the potential peak re-growth. Observe that if $|X(n)| \ll \max|X|$, then the chance of $X(n)$ becoming a new peak is small. On the other hand, if $|X(n)| \approx \max|X|$, then, very likely, $X(n)$ will become a new peak. Therefore, in some embodiments, the WTR method 200 applies some weight or cost constraint, according to $|X|$, when generating $X_c$ to reduce the PAPR of the communications system.

By setting the PAPR target, $PAPR_0$, the WTR method 200 finds the time domain signal, $X_p$, to satisfy the following equation:

$$PAPR(X-X_p) = PAPR_0 \quad (2)$$

by clipping. Now, instead of directly subtracting $X_p$, the WTR method 200 generates a similar signal by transmitting a sequence, C, in the reserved tones. The sequence, C, is generated using the following criteria:

$$C = \arg\min_C D^T |X_p - AC|^2 \quad (3)$$

where A is the inverse fast Fourier transform (IFFT) matrix of sequence, C, and D is a weight function.

In some embodiments, the WTR method 200 calculates C using the following equation:

$$C = (A^H W A)^{-1} A^H W X_p \quad (4)$$

where H is a default expression for the matrix operation known as conjugate transpose, $A^H=(A')^*$, $A'$, where $A'$ is the transpose of matrix A, $A^*$ is the conjugate complex of matrix A, and W is a weighted array. The detailed derivation of equation (4) is found at the end of this document, below.

In some embodiments, the weighted function, D, is chosen to reduce the peak re-growth. For example, the WTR method 200 may choose D to mach the signal power profile so that the re-growth of high power tones is reduced. Other choices of D are also possible, such as in equation (5):

$$D=(|X|^2) \quad (5)$$

By using the vector, D, the WTR method 200 obtains the weighted array, W, as follows:

$$W = \begin{Bmatrix} D_1 & 0 & \cdots & \cdots & 0 \\ 0 & \cdots & 0 & \cdots & \cdots \\ \cdots & 0 & D_i & 0 & \cdots \\ \cdots & \cdots & 0 & \cdots & 0 \\ 0 & \cdots & \cdots & 0 & D_N \end{Bmatrix}_{N \times N} \quad (6)$$

In some embodiments, once the sequence, C, is calculated, the WTR method 200 performs PAPR reduction using the following equation:

$$X_{new}=X-AC \quad (7)$$

The novel WTR algorithm 200 is evaluated using simulation, to evaluate the efficiency of weighted factor D, expressed in equation (5), above. Simulation parameters are selected as follows:

512-IFFT 20000 randomly generated OFDM Symbols

QPSK modulation number of reserved tones: 5% clipping rate 0.8

The clipping rate is described in more detail in the flow diagram of FIG. 5, below.

Figure 2:
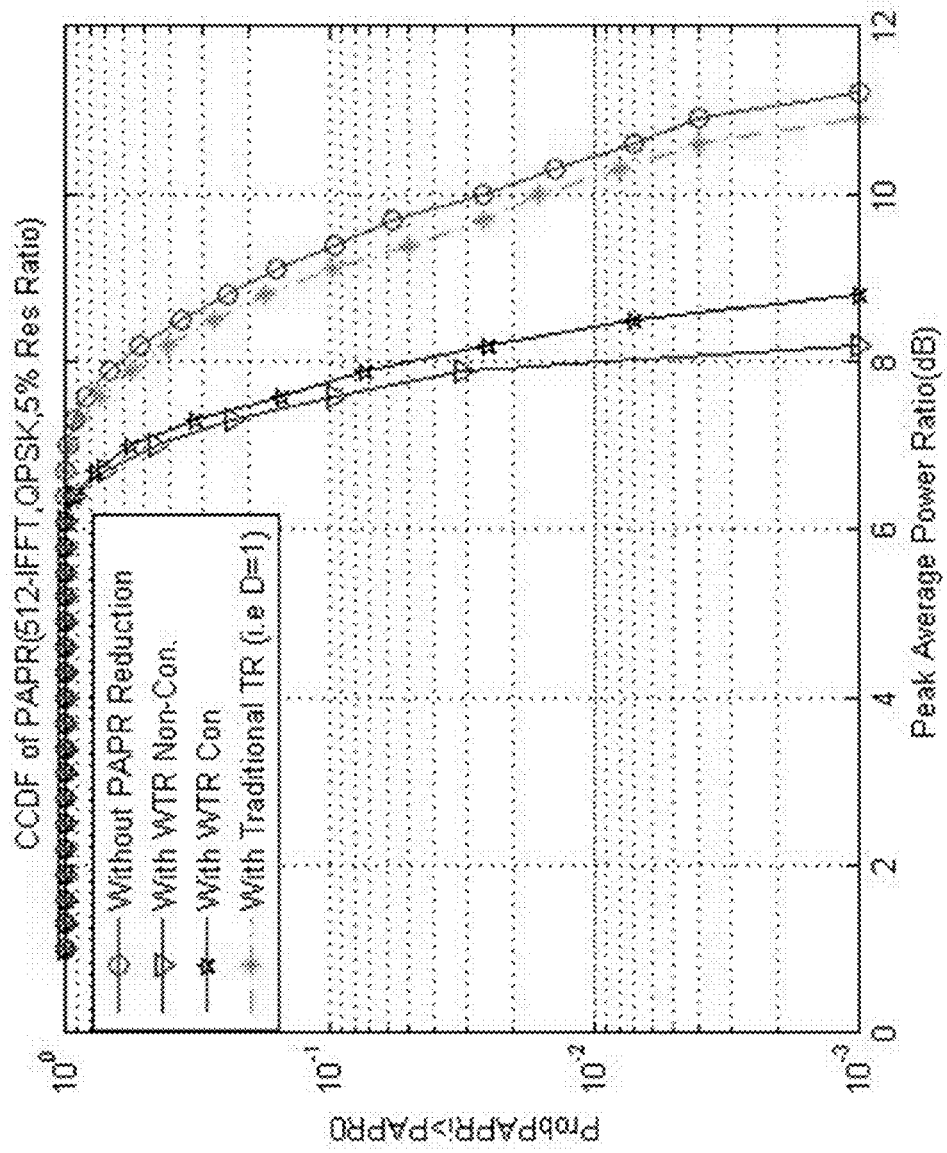
FIG. 2 is a graph comparing the continuous and non-continuous weighted tone reservation method with traditional tone reservation and no PAPR reduction, according to some embodiments.

FIG. 2 is a graph 60 plotting the peak-to-average power ratio (in decibels, dB) for a clipping rate of 0.8, according to some embodiments. According to the simulation parameters, four complementary cumulative distribution function (CCDF) curves are generated in the simulation, and shown in the graph 60. The "star" plot is for simulation without PAPR reduction, the "asterisk" plot is for simulation with non-continuous reserved tones (using the WTR method 200), the "diamond" plot is for simulation with continuous reserved tones (using the WTR method 200), and the "triangle" plot is for simulation with legacy tone reservation. With the legacy tone reservation plot, the weight factor, D, is set to be one. In other words, no weighting is used, as in traditional tone reservation.

The results shown in the graph 60 demonstrate that the WTR method 200 successfully solves the peak re-growth problem of the traditional TR algorithm. The WTR method 200 reduces PAPR by about 3 dB, compared to raw OFDM symbols, in some embodiments, and reduces PAPR by about 2 dB compared to the traditional TR algorithm.

The Effects of Reserved Tones Ratio (5% Versus 10%)

Figure 3:
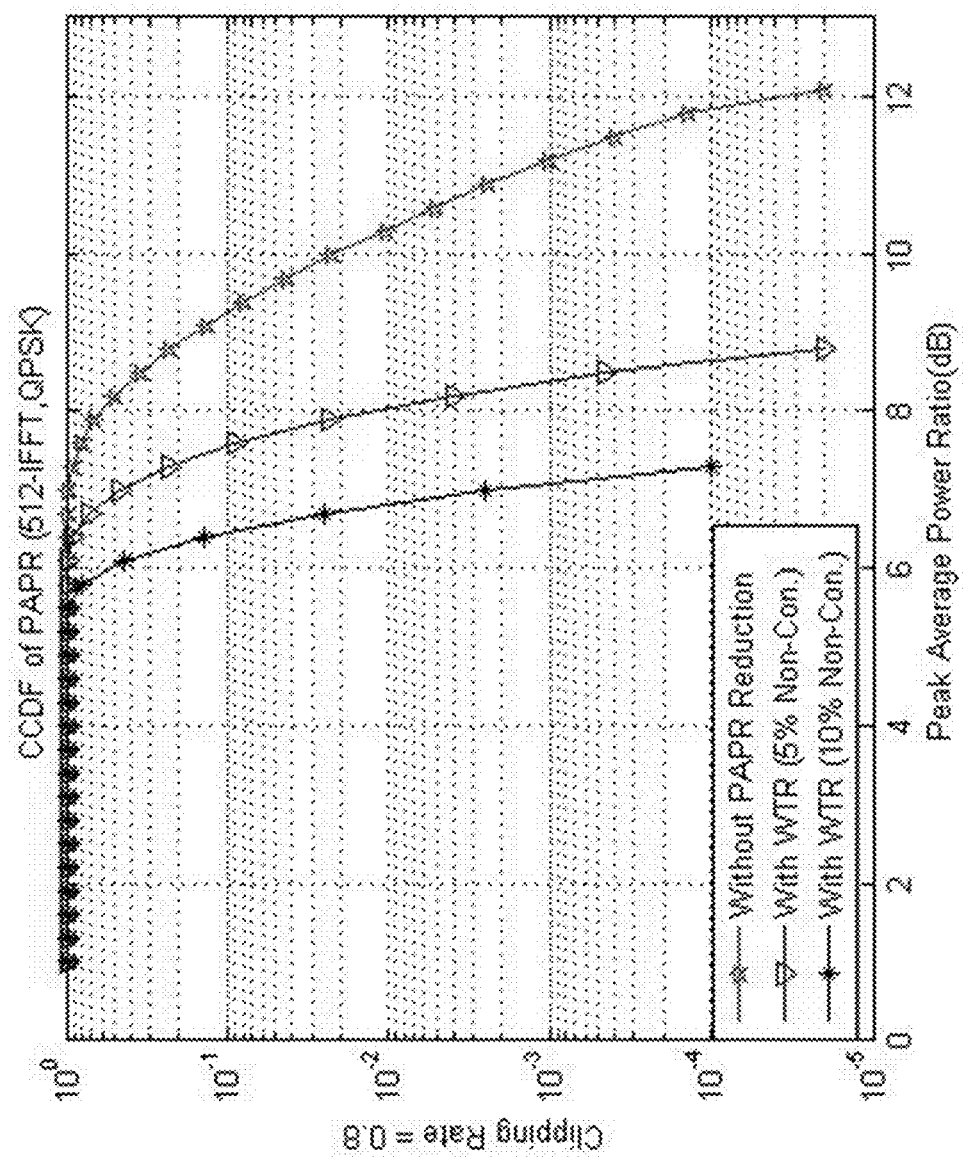
FIG. 3 is a graph comparing the weighted tone reservation method with no PAPR reduction for 5% and 10% reserved tones, according to some embodiments.

FIG. 3 is a graph 70 showing the peak-to-average power ratio (dB) for a clipping rate of 0.8, according to some embodiments. The "star" plot shows no PAPR reduction, the "triangle" plot shows the results using the WTR method 200 with 5% non-continuous reserved tones, and the "asterisk" plot shows the results using 10% non-continuous reserved tones.

According to simulation results, the WTR method 200 with 5% reserved tones reduces PAPR by 3 dB over implementations with no PAPR reduction, in some embodiments. The WTR method 200 with 10% reserved tones reduces PAPR by more than 4 dB over implementations with no PAPR reduction, in some embodiments. These results are obtained with the following simulation parameters: 512 FFT, 1000 random generated OFDM symbols, QPSK modulation.

Figure 4:
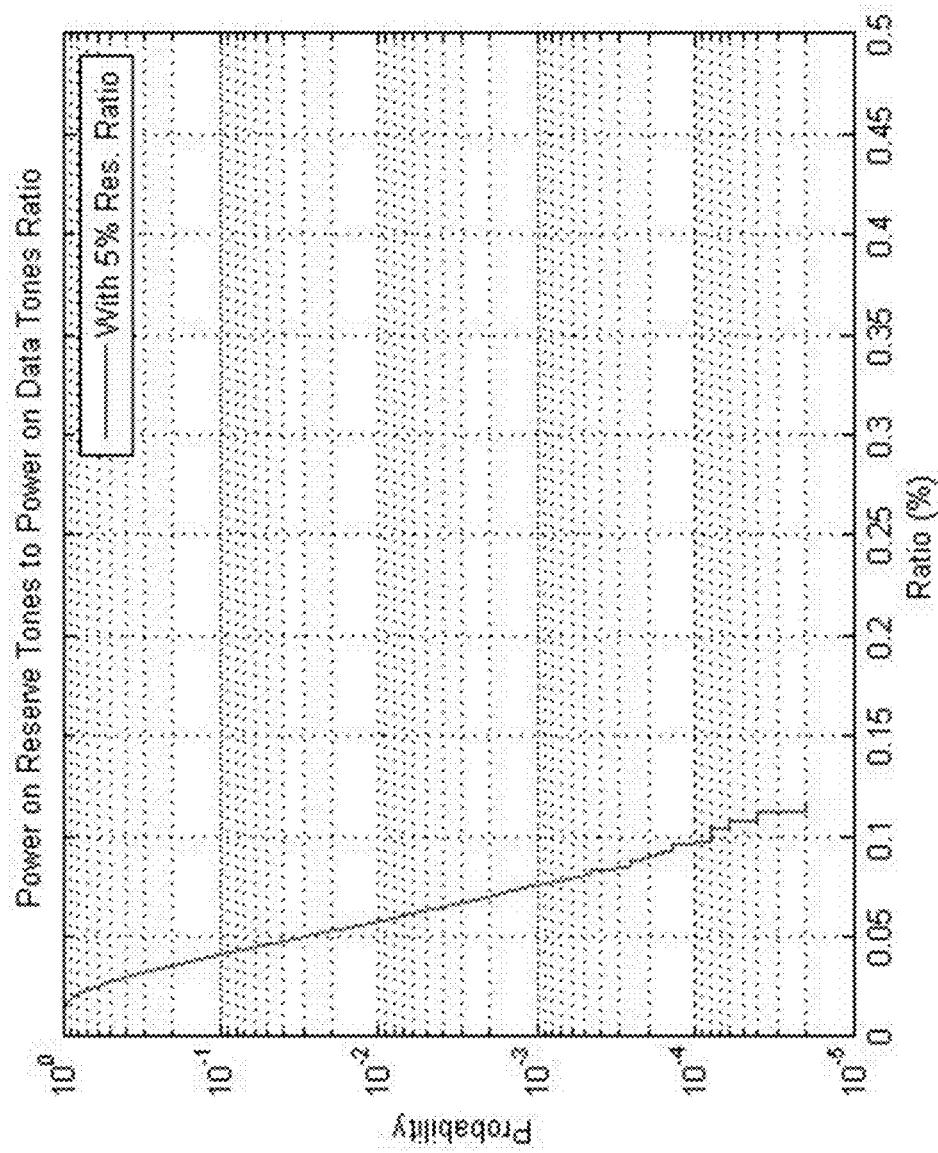
FIG. 4 is a graph plotting a ratio of power on reserved tones to power on data tones, according to some embodiments.

FIG. 4 is a graph 80 plotting a ratio between power on reserved tones and power on data tones, according to some embodiments. As shown in the graph 80, all power on reserved tones are very small, less than 0.12. This means that the power on reserved tones is greater than 9.2 dB lower than the power on data tones, in some embodiments. This result is used to show that the power on the reserved tone is very small, and 10% WTR will always be smaller than 5% WTR (due to the double tones).

The simulation results show that the novel WTR method 200 may suppress peak re-growth better than traditional TR algorithms, with a small system overhead. Comparing to the traditional TR algorithm, the WTR method 200 effectively suppresses the PAPR peak re-growth after the PAPR reduction process takes place.

Figure 5:
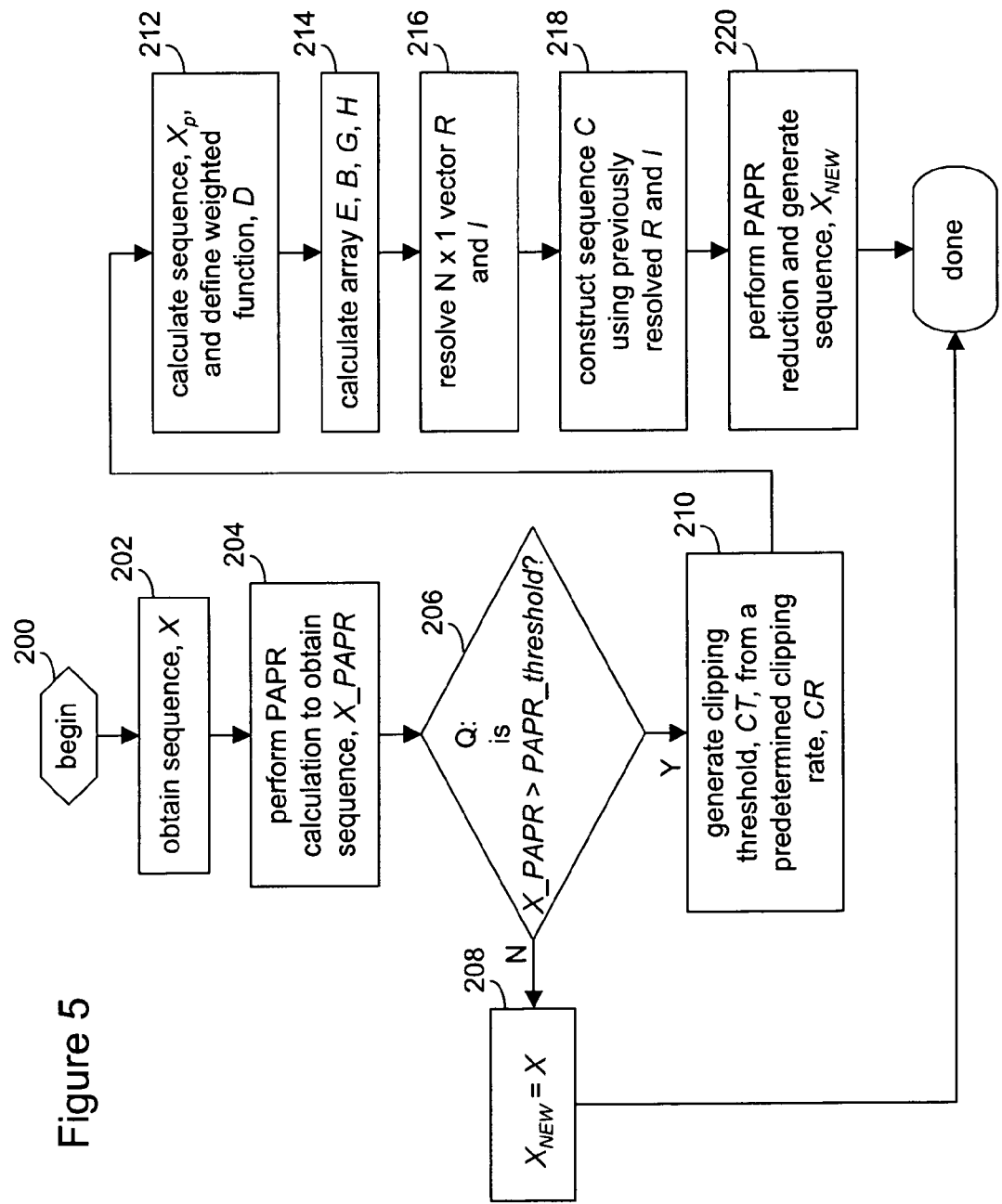
FIG. 5 is a flow diagram of operations performed by the weighted tone reservation method of FIG. 1, according to some embodiments.

FIG. 5 is a flow diagram depicting operations performed by the WTR method 200 in the OFDMA communication system 100. Some system parameters related to processing by the WTR method 200 include FFT size N, number of reserved tones, M, location of reserved tones, sequence, $T=\{t_k\}$, $k=1 \sim M, 1 \leq t_k \leq N$, and IFFT transforming two-dimensional N×N array, A, expressed as $$A_{p,q} = \frac{1}{N} \exp\left(\frac{2\pi p q}{N} i\right),$$

where i is the imaginary unit. In a 10 MHz WiMax system, for example, the FFT size, N=1024. Also, the constant value for PAPR_threshold, is the threshold if X is necessary to perform PAPR reduction.

Referring to the flow diagram 200, after the sequence, X, is obtained (block 202), a PAPR calculation of the input sequence is performed, using equation (8):

$$X\_PAPR = 10 \log_{10} \frac{\text{Max}(|X|^2)}{E(|X|^2)} \quad (8)$$

where E is a default expression used in statistics to represent a mean function, resulting in the sequence, X_PAPR (block 204). Due to the digital sampling sequence of X, if more accurate computation is needed, in some embodiments, a two times or four times up-sampling transform for the sequence, X, is done before using equation (8) to calculate the PAPR.

Once computed, the X_PAPR sequence is compared to a threshold value, PAPR_threshold (block 206), to decide whether PAPR reduction is warranted. If so, the sequence, $X_p$, is to be calculated. First, however, a clipping threshold, CT, is to be generated, as the clipping threshold is used to calculate the sequence, $X_p$. The clipping threshold is generated from a predetermined clipping rate, CR (block 210), which may be chosen during system implementation. In some embodiments, the clipping rate, CR, is a value between $0 \sim \sqrt{2}$. In the above simulation, a clipping rate of 0.8 is used. The following equation is used to calculate the clipping threshold, CT, from the clipping rate, CR:

$$CT = CR \times \sqrt{2} \times \text{std}(X) \tag{9}$$

where the function, std(X), returns the standard deviation of X.

The clipping process may be performed to generate the signal sequence, Xp, and, at the same time, generate the weighted factor sequence, D (block 212). In some embodiments, the following pseudo-code is used to generate the signal sequence, Xp, and the weighted factor sequence, D, as follows:

for $i = 0$ to $N - 1$ if $|X| > CT$, then $Xp(i) = X(i) - \frac{X(i)}{|X(i)|} \times CT$;

else $Xp(i) = 0$; end if $D(i) = |X(i)|^2$ end for

In some embodiments, the weighted factor sequence, D, is defined as the power of X. In other embodiments, the weighted factor sequence is $|X|^3$. The weighted factor sequence is not limited, as other weighted factor expressions may be chosen.

Figure 6:
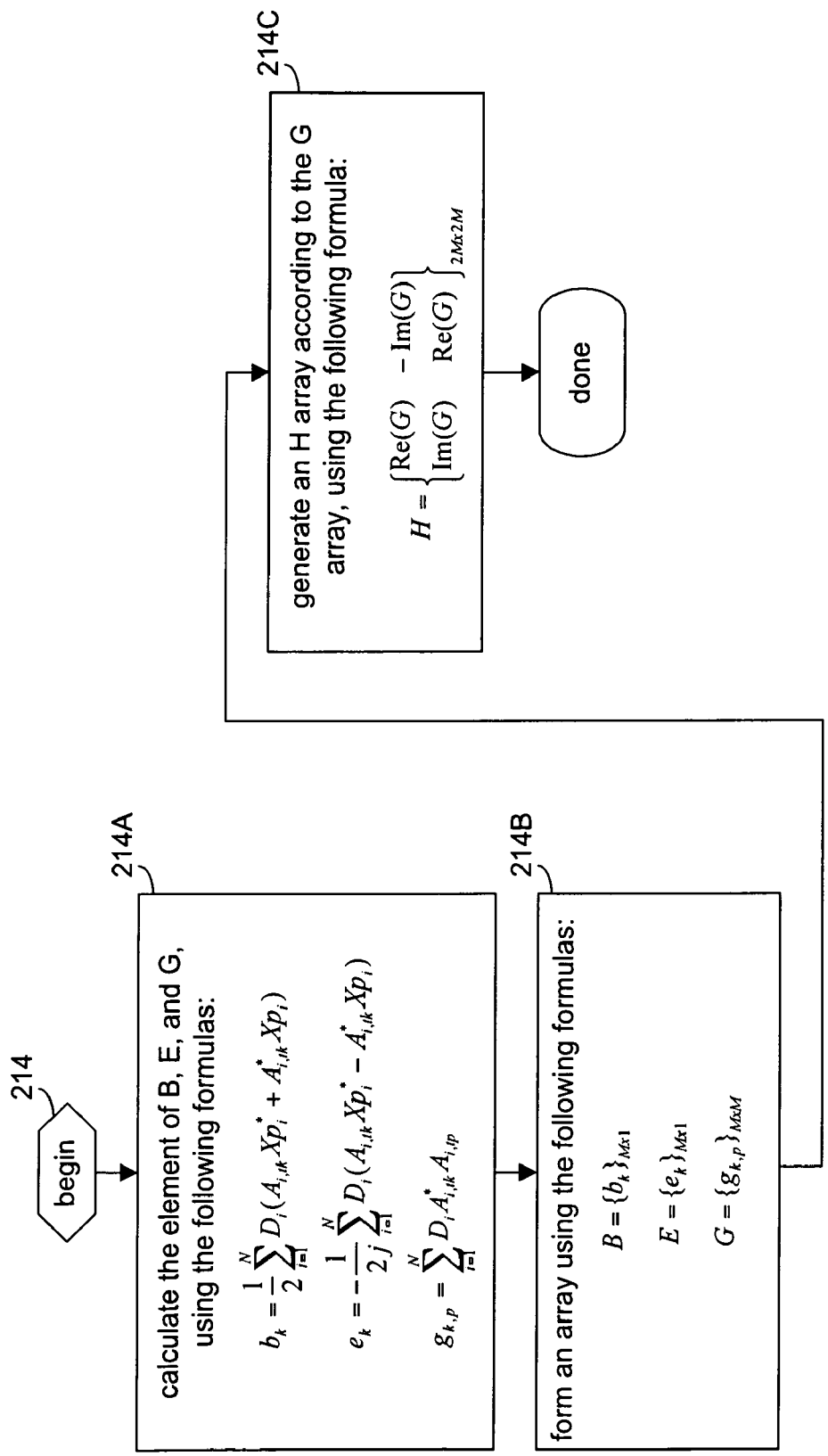
FIG. 6 is a flow diagram of additional operations performed by the weighted tone reservation method of FIG. 1, according to some embodiments.

Once the sequence, Xp, and weighted function, D, are obtained, arrays, B, E, G, and H are calculated (block 214). In some embodiments, these calculations are achieved in three steps, as illustrated in FIG. 6. First, the elements of B, E, G, are calculated (block 214A), using the following equations:

$$b_k = \frac{1}{2} \sum_{i=1}^{N} D_i (A_{i,tk} Xp_i^* + A_{i,tk}^* Xp_i) \tag{10}$$

$$e_k = -\frac{1}{2j} \sum_{i=1}^{N} D_i (A_{i,tk} Xp_i^* - A_{i,tk}^* Xp_i)$$

$$g_{k,p} = \sum_{i=1}^{N} D_i A_{i,tk}^* A_{i,tp}$$

respectively. Next, the arrays B, E, and G from the array elements, $b_k$, $e_k$, and $g_k$, respectively, from equation (10) are formed (block 214B), using the following equations:

$$B = \{b_k\}_{M \times 1}$$

$$E = \{e_k\}_{M \times 1}$$

$$G = \{g_{k,p}\}_{M \times M} \tag{11}$$

Finally, an H array is generated from the array, G (block 214C), using the following equation:

$$H = \begin{Bmatrix} \text{Re}(G) & -\text{Im}(G) \\ \text{Im}(G) & \text{Re}(G) \end{Bmatrix}_{2M \times 2M} \tag{12}$$

Returning to FIG. 5, after arrays B, E, G, and H have been calculated, the vectors, R and I are resolved (block 216). In some embodiments, the vectors are resolved using arrays E, B, H, in the following equation:

$$\begin{Bmatrix} \{R_k\}_{M \times 1} \\ \{I_k\}_{M \times 1} \end{Bmatrix}_{2M \times 1} = H_{2M \times 2M}^{-1} \begin{Bmatrix} B \\ E \end{Bmatrix} \tag{13}$$

In this process, the PAPR reduction is accomplished using the resolved vectors, R and I. First, using the resolved vectors, a sequence, C, is constructed as follows (block 218):

for $k = 0$ to $M - 1$ do $Ct_k = R_k + jI_k$ end for $j = 0$ to $N - 1$ do $$C_j = \begin{Bmatrix} = Ct_k & j \in \{t_k\} \\ = 0 & j \notin \{t_k\} \end{Bmatrix}$$

$k = 1 \sim M$, $1 \le t_k \le N$, $j = 1 \sim N$ end

Here, $C_j$, is the element of sequence, C, of length N. Then, PAPR reduction is performed and the new sequence, $X_{NEW}$, is generated (block 220), using the following equation:

$$X_{new} = X - AC \tag{14}$$

Where X_PAPR is not greater than the threshold, PAPR_threshold (the "no" prong of block 206), PAPR reduction is not necessary. Accordingly, the output, $X_{NEW}$, is replaced with the input X: $X_{NEW} = X$ (block 208). At the end of this process, the output, $X_{NEW}$, is sent to the cyclic prefix 30 (FIG. 1).

The novel WTR method 200 and OFDMA communications system 100 achieve PAPR reduction, which may be used to improve the performance of wireless communication system that are based on OFDM technology. In some embodiments, wireless broadband product manufacturers (base station, mobile device, or silicon) may use some or all of the WTR method 200 to improve system performance.

Detailed Derivation of Equation (4)

Define function f(C) as follows:

$$f(C) = D^T |X_p - AC|^2 \tag{15}$$

$$= \sum_{i=1}^{N} D_i [Xp_i - (AC)_i][Xp_i - (AC)_i]$$

$$= \sum_{i=1}^{N} D_i [Xp_i - (AC)_i] \times [Xp_i^* - (AC)_i^*]$$

So, equation (3), above, has been changed according to equation (15).

$$C = \underset{C}{\arg\min} f(C) \tag{16}$$

C is the vector with length of N and M non-zero elements, i.e.

$$C_j = \begin{Bmatrix} \ne 0 & j \in \{t_k\} \\ = 0 & j \notin \{t_k\} \end{Bmatrix} \tag{17}$$

$k = 1 \sim M$, $1 \le t_k \le N$

Define:

$$R_k = Re(Ct_k)$$

$$I_k = Im(Ct_k), k=1\sim M \quad (18)$$

According to equation (16), when f(C) reach its minimum value, the result is:

$$\begin{cases} \dfrac{\partial f(C)}{R_k} = 0, & k = 1\sim M \\ \dfrac{\partial f(C)}{I_k} = 0, & k = 1\sim M \end{cases} \quad (19)$$

Real Part Formula Derivation

First, consider one real part $R_k$ equation $$\frac{\partial f(C)}{R_k} = 0$$

in formula (8), above, the following may be derived:

$$\sum_{i=1}^{N} D_i \left\{ \frac{\partial (AC)_i}{\partial (R_k)} [Xp_i^* - (AC)_i^*] + \frac{\partial (AC)_i^*}{\partial (R_k)} [Xp_i - (AC)_i] \right\} = 0 \quad (20)$$

$$\Rightarrow$$

$$\sum_{i=1}^{N} D_i \{ A_{i,tk} [Xp_i^* - (AC)_i^*] + A_{i,tk}^* [Xp_i - (AC)_i] \} = 0$$

$$\Rightarrow$$

$$\sum_{i=1}^{N} D_i (A_{i,tk} Xp_i^* + A_{i,tk}^* Xp_i) = \sum_{i=1}^{N} D_i [A_{i,tk} (AC)_i^* + A_{i,tk}^* (AC)_i]$$

Because:

$$(AC)_i = \sum_{p=1}^{M} A_{i,tp} C_{tp} \quad (21)$$

Fill equation (21) into the right part of equation (20), to produce the following result:

$$\sum_{i=1}^{N} D_i [A_{i,tk} (AC)_i^* + A_{i,tk}^* (AC)_i] = \quad (22)$$

$$\sum_{i=1}^{N} \sum_{p=1}^{M} D_i [A_{i,tk} A_{i,tp}^* C_{tp}^* + A_{i,tk}^* A_{i,tp} C_{tp}] =$$

$$\sum_{p=1}^{M} \left[ \left( \sum_{i=1}^{N} D_i A_{i,tk} A_{i,tp}^* \right) C_{tp}^* + \left( \sum_{i=1}^{N} D_i A_{i,tk}^* A_{i,tp} \right) C_{tp} \right]$$

Define $$b_k = \frac{1}{2} \sum_{i=1}^{N} D_i (A_{i,tk} Xp_i^* + A_{i,tk}^* Xp_i) \quad (23)$$

-continued $$g_{k,p} = \sum_{i=1}^{N} D_i A_{i,tk}^* A_{i,tp}$$

$$k = 1\sim M, p = 1\sim M$$

According to equation (23), equation (22) may be expressed as follows:

$$\sum_{p=1}^{M} Re(g_{k,p}) R_k - \sum_{p=1}^{M} Im(g_{k,p}) I_k = b_k, k = 1\sim M \quad (24)$$

Imaginary Part Formula Derivation

Consider the equation, $$\frac{\partial f(C)}{I_k} = 0,$$

k=1~M. In equation (8), the following may be derived:

$$\sum_{i=1}^{N} D_i \left\{ \frac{\partial (AC)_i}{\partial (I_k)} [Xp_i^* - (AC)_i^*] + \frac{\partial (AC)_i^*}{\partial (I_k)} [Xp_i - (AC)_i] \right\} = 0 \quad (25)$$

$$\Rightarrow$$

$$\sum_{i=1}^{N} D_i \{ A_{i,tk} [Xp_i^* - (AC)_i^*] - A_{i,tk}^* [Xp_i - (AC)_i] \} = 0$$

$$\Rightarrow$$

$$\sum_{i=1}^{N} D_i (A_{i,tk} Xp_i^* - A_{i,tk}^* Xp_i) = \sum_{i=1}^{N} D_i [A_{i,tk} (AC)_i^* - A_{i,tk}^* (AC)_i]$$

If equation (21) is filled into the right part of equation (25), the result is:

$$\sum_{i=1}^{N} D_i [A_{i,tk} (AC)_i^* - A_{i,tk}^* (AC)_i] = \quad (26)$$

$$\sum_{i=1}^{N} \sum_{p=1}^{M} D_i [A_{i,tk} A_{i,tp}^* C_{tp}^* - A_{i,tk}^* A_{i,tp} C_{tp}] =$$

$$\sum_{p=1}^{M} \left[ \left( \sum_{i=1}^{N} D_i A_{i,tk} A_{i,tp}^* \right) C_{tp}^* - \left( \sum_{i=1}^{N} D_i A_{i,tk}^* A_{i,tp} \right) C_{tp} \right]$$

Here, equation (27) is defined as:

$$e_k = -\frac{1}{2j} \sum_{i=1}^{N} D_i (A_{i,tk} Xp_i^* - A_{i,tk}^* Xp_i) \quad (27)$$

$$g_{k,p} = \sum_{i=1}^{N} D_i A_{i,tk}^* A_{i,tp}$$

According to equation (27), equation (26) may be expressed as following:

$$\sum_{p=1}^{M} \text{Im}(g_{k,p})R_k + \sum_{p=1}^{M} \text{Re}(g_{k,p})I_k = e_k, \, k = 1 \sim M \quad (28)$$

Combined Equations

Combining the result of equations (23), (24), (27), and (28), the following equations (29) and (30) result:

$$\begin{cases} \sum_{p=1}^{M} \text{Re}(g_{k,p})R_k - \sum_{p=1}^{M} \text{Im}(g_{k,p})I_k = b_k, & k = 1 \sim M \\ \sum_{p=1}^{M} \text{Im}(g_{k,p})R_k + \sum_{p=1}^{M} \text{Re}(g_{k,p})I_k = e_k, & k = 1 \sim M \end{cases} \quad (29)$$

$$b_k = \frac{1}{2} \sum_{i=1}^{N} D_i (A_{i,tk} Xp_i^* + A_{i,tk}^* Xp_i) \quad (30)$$

and $$e_k = -\frac{1}{2j} \sum_{i=1}^{N} D_i (A_{i,tk} Xp_i^* - A_{i,tk}^* Xp_i)$$

$$g_{k,p} = \sum_{i=1}^{N} D_i A_{i,tk}^* A_{i,tp}$$

Defining:

$$E = \{e_k\}_{M \times 1}, \, B = \{b_k\}_{M \times 1}, \, G = \{g_{k,p}\}_{M \times M},$$

$$\text{and } H = \begin{cases} \text{Re}(G) & -\text{Im}(G) \\ \text{Im}(G) & \text{Re}(G) \end{cases}_{2M \times 2M}$$

equation (29) may be expressed as:

$$H_{2M \times 2M} \begin{cases} \{R_k\}_{M \times 1} \\ \{I_k\}_{M \times 1} \end{cases}_{2M \times 1} = \begin{cases} B \\ E \end{cases} \quad (31)$$

$$\Rightarrow$$

$$\begin{cases} \{R_k\}_{M \times 1} \\ \{I_k\}_{M \times 1} \end{cases}_{2M \times 1} = H_{2M \times 2M}^{-1} \begin{cases} B \\ E \end{cases} \quad (32)$$

Performing PAPR Reduction with WTR Algorithm Result

According to equation (32), $R_k$ and $I_K$ may be calculated, and then, according to:

$$Ct_k = R_k + jI_k \quad (33)$$

the vector, C, may be reconstructed with its element, $C_j$, joined by equation (34):

$$C_j = \begin{cases} = Ct_k & j \in \{t_k\} \\ = 0 & j \notin \{t_k\} \end{cases} \quad (34)$$

$$k = 1 \sim M, \, 1 \le t_k \le N, \, j = 1 \sim N$$

While the application has been described with respect to a limited number of embodiments, those skilled in the art will appreciate numerous modifications and variations therefrom. It is intended that the appended claims cover all such modifications and variations as fall within the true spirit and scope of the invention.

What is claimed is:

1. A weighted tone reservation method, comprising:
   obtaining a sequence, X, wherein X is derived from binary data input to be transformed and transmitted wirelessly over an antenna using orthogonal frequency division multiple access modulation;
   calculating a second sequence, X_PAPR, using the sequence, X and the following equation:

$$\text{X\_PAPR} = 10 \log_{10} \frac{\text{Max}(|X|^2)}{E(|X|^2)}.$$

wherein $|X|$ is an amplitude profile of sequence, X, $\text{Max}(|X|^2)$ is a maximum of the square of the amplitude profile of sequence, X, and $E(|X|^2)$ is a mean of the square of the amplitude profile of sequence, X; and
   generating a third sequence, $X_{NEW}$, a linear addition of the sequence, X, and a fourth sequence generated by reserved tones on a frequency domain if the second sequence, X_PAPR, exceeds a threshold value;
   wherein the third sequence, Xnew, is the same as the sequence, X, if the second sequence, X_PAPR, does not exceed the threshold value;
   determining that the second sequence, X_PAPR, exceeds the threshold value;
   calculating a clipping threshold, CT, based on a predetermined clipping rate, CR; and
   using the clipping threshold to generate a fifth sequence, $X_p$, wherein the fifth sequence, $X_p$, is used to generate the new sequence, $X_{NEW}$.

2. The weighted tone reservation method of claim 1, calculating a clipping threshold, CT, based on a predetermined clipping rate, CR, further comprising:
   calculating the clipping threshold, CT, based on the predetermined clipping rate, CR, wherein the clipping rate, CR, is between 0 and $\sqrt{2}$.

3. The weighted tone reservation method of claim 1, calculating a clipping threshold, CT, based on a predetermined clipping rate, CR, further comprising:
   calculating the clipping threshold, CT, using the following equation:

$$CT = CR \times \sqrt{2} \times \text{std}(X),$$

wherein std(X) is a standard deviation of the sequence, X.

4. The weighted tone reservation method of claim 1, further comprising:
   calculating the fifth sequence, $X_p$, using the following sequence:

$$\text{for } i = 0 \text{ to } N-1 \text{ if } |X| > CT, \text{ then } Xp(i) = X(i) - \frac{X(i)}{|X(i)|} \times CT;$$

$$\text{else } Xp(i) = 0; \text{ end if; and}$$

calculating a weighted factor sequence, D, using the following equation:

$$D(i) = |X(i)|^2,$$

wherein |X| is an amplitude profile of the sequence, X, X(i) is the ith entry of sequence, X, Xp(i) is the ith entry of sequence, Xp, and D(i) is the ith entry of the weighted factor sequence, D.

5. The weighted tone reservation method of claim 4, further comprising:
using the fifth sequence, $X_p$, to calculate arrays B, E, G, and H.

6. A communication method, comprising:
using an inverse fast Fourier transform to convert binary input data for transmission into a sequence, X;
applying a weighted tone reservation algorithm to find a time domain sequence, $X_p$, to satisfy the equation, PAPR $(X-X_p)$=$PAPR_0$, wherein PAPR is a peak-to-average power ratio of a signal and $PAPR_0$ is a target peak-to-average power ratio of the signal;
generating a signal similar to the sequence, $X_p$, by transmitting a second sequence, C, in reserved tones, wherein the second sequence, C, is generated using the following criteria:

$$C = \arg\min_{C} D^T |X_p - AC|^2$$

wherein A is an inverse fast Fourier transform matrix of the sequence, C, D is a weight function, $D^T$ is a transpose of weight function, D, and arg min is the argument minimum of C; and
transmitting a third sequence, $X_{new}$, having reduced peak-to-average power ratio over the sequence, X, derived from the second sequence, C.

7. The communication method of claim 6, further comprising:
calculating the second sequence, C, using the following formula:

$$C=(A^H WA)^{-1} A^H W X_p,$$

wherein H is a conjugate transpose where $A^H=(A')^*$, A' is a transpose of matrix A, W is a weighted array, Xp is a time domain signal, and A* is a conjugate complex of matrix A.

8. The communication method of claim 6, further comprising:
generating randomized data from the binary input data;
encoding the randomized data to produce encoded data; and
generating interleaved data from the encoded data.

9. The communication method of claim 8, further comprising:
transmitting the third sequence, $X_{new}$, to a receiver.

10. A method, comprising:
obtaining a sequence X, wherein X is derived from binary data input;
calculating a second sequence, C, using the formula, $C=(A^H WA)^{-1} A^H W X_p$, wherein H is a conjugate transpose where $A^H=(A')^*$, A' is a transpose of matrix A, A* is a conjugate complex of matrix A, $X_p$ is a time domain signal, and W is a weighted array; and
transmitting the second sequence in reserved tones of the binary input data.

11. The method of claim 10, calculating a second sequence, C, further comprising:
generating the second sequence, C, using the following criteria:

$$C = \arg\min_{C} D^T |X_p - AC|^2,$$

wherein D is a weight vector and arg min is the argument minimum of C.

12. The method of claim 11, further comprising:
using the vector, D, to obtain the weighted array, as follows:

$$W = \begin{Bmatrix} D_1 & 0 & \cdots & \cdots & 0 \\ 0 & \cdots & 0 & \cdots & \cdots \\ \cdots & 0 & D_i & 0 & \cdots \\ \cdots & \cdots & 0 & \cdots & 0 \\ 0 & \cdots & \cdots & 0 & D_N \end{Bmatrix}_{N \times N}$$

wherein N is the fast Fourier transform size and i is an integer between 1 and N.

13. The method of claim 12, further comprising:
calculating the new sequence, $X_{new}$, using the sequence, X, the matrix, A, and the second sequence, C, in the following formula:

$$X_{new}=X-AC.$$

* * * * *